(12) United States Patent
Gauch et al.

(10) Patent No.: US 9,889,523 B2
(45) Date of Patent: Feb. 13, 2018

(54) METHOD AND DEVICE FOR PROCESSING A WORKPIECE USING LASER RADIATION

(71) Applicant: Robert Bosch GmbH, Stuttgart (DE)

(72) Inventors: Roland Gauch, Ditzingen (DE); Ulrich Graf, Bietigheim-Bissingen (DE)

(73) Assignee: Robert Bosch GMBH, Stuttgart (DE)

( * ) Notice: Subject to any disclaimer, the term of this patent is extended or adjusted under 35 U.S.C. 154(b) by 384 days.

(21) Appl. No.: 14/397,522

(22) PCT Filed: Mar. 18, 2013

(86) PCT No.: PCT/EP2013/055574
§ 371 (c)(1),
(2) Date: Oct. 28, 2014

(87) PCT Pub. No.: WO2013/164125
PCT Pub. Date: Nov. 7, 2013

(65) Prior Publication Data
US 2015/0129565 A1    May 14, 2015

(30) Foreign Application Priority Data

Apr. 30, 2012  (DE) .................. 10 2012 207 220

(51) Int. Cl.
| | |
|---|---|
| *B23K 26/073* | (2006.01) |
| *B23K 26/384* | (2014.01) |
| *B23K 26/066* | (2014.01) |
| *B23K 26/40* | (2014.01) |
| *B23K 26/382* | (2014.01) |
| *B23K 103/00* | (2006.01) |

(52) U.S. Cl.
CPC .......... *B23K 26/073* (2013.01); *B23K 26/066* (2015.10); *B23K 26/384* (2015.10); *B23K 26/389* (2015.10); *B23K 26/40* (2013.01); *B23K 2203/50* (2015.10)

(58) Field of Classification Search
CPC combination set(s) only.
See application file for complete search history.

(56) References Cited

U.S. PATENT DOCUMENTS

| | | | |
|---|---|---|---|
| 6,577,380 B1 | 6/2003 | Sposili et al. | |
| 8,847,109 B2 * | 9/2014 | Kuhl .................. | B23K 26/0626 |
| | | | 219/121.68 |

(Continued)

FOREIGN PATENT DOCUMENTS

| | | |
|---|---|---|
| CN | 1397403 A | 2/2003 |
| CN | 1573418 A | 2/2005 |

(Continued)

Primary Examiner — Anne M Antonucci
Assistant Examiner — Renee LaRose
(74) Attorney, Agent, or Firm — Norton Rose Fulbright US LLP; Gerard Messina

(57) ABSTRACT

A method is provided for processing a workpiece using laser radiation, particularly for the purpose of laser ablation. At least one laser beam is provided, which is affected using at least one changeable beam forming device. The laser beam subsequently impinges upon at least one processing area of the workpiece. Using the beam forming device, at least one specified adjustable beam profile is impressed upon the laser beam at the location of the processing area configured.

10 Claims, 3 Drawing Sheets

(56) References Cited

U.S. PATENT DOCUMENTS

| | | | | |
|---|---|---|---|---|
| 2002/0008091 A1* | 1/2002 | Brandinger | ............ | B23K 26/04 |
| | | | | 219/121.67 |
| 2010/0020376 A1* | 1/2010 | Reynolds | ................. | B41J 2/451 |
| | | | | 359/207.1 |
| 2010/0241108 A1* | 9/2010 | Wullner | .................. | A61F 9/008 |
| | | | | 606/5 |

FOREIGN PATENT DOCUMENTS

| JP | 2002292488 A | 10/2002 |
|---|---|---|
| JP | 2006119427 A | 5/2006 |
| WO | 1999/45441 | 9/1999 |
| WO | 2009/115785 | 9/2009 |
| WO | 2011107602 A2 | 9/2011 |

* cited by examiner

METHOD AND DEVICE FOR PROCESSING A WORKPIECE USING LASER RADIATION

FIELD OF THE INVENTION

The present invention relates to methods and devices for processing a workpiece using laser radiation. Such devices and methods are particularly able to be used in order to remove three-dimensional microgeometries in materials. Without limiting further possible examples of applications, referred to, in this regard, for instance, are laser ablation techniques in the production of metallic surface structures, for instance, for improving frictional properties, in the production of nozzles or in the production of ceramic sensor elements, such as lambda sensors or other types of ceramic gas sensors. Numerous other applications for such laser ablation techniques are conceivable.

BACKGROUND INFORMATION

For material removal, lasers having ultrashort laser pulses (USP) are used. Lasers are particularly denoted as ultrashort pulse lasers which emit pulsed laser light having pulse widths in the range of picoseconds and femtoseconds or shorter, having pulse durations of at most 100 picoseconds, which may be more than 10 picoseconds. Such ultrashort pulse lasers enable, in particular, a virtually melt-free and burr-free removal of the material, as long as the pulse energy is not too high. The geometries to be removed, in this instance, are usually specified in the related art by a freely programmable scanner system. In this case, the geometry is scanned on the workpiece, using a laser beam having a small beam diameter, and is removed by it piece by piece and layer by layer.

In practice, however, the removal of complex and particularly three-dimensional geometries in many cases requires unprofitably long processing times. Shortening the processing time is usually only possible by increasing the removal rates. This increase in the removal rates mostly requires an increase in the average laser power $P_{av}=E_p \cdot f_p$, where $P_{av}$ is the average laser power, $E_p$ is the pulse energy of a single pulse, and $f_p$ is the pulse frequency. If this power increase is implemented, for the same optical imaging system, only via an increase in the pulse energy $E_p$, the advantage of the virtually melt-free and virtually burr-free removal is usually lost.

In order to maintain the processing precision at an increased removal rate, in practice it is therefore required, as a rule, at constant pulse energy, to raise the repetition rate or pulse frequency $f_p$. At the same time, however, to obtain the virtually melt-free removal, the overlap of the individual pulses on the workpiece has to be kept essentially constant. As a result, in practice, the feed rate of the laser beam on the workpiece mostly has to be increased in proportion to the repetition rate.

The usual scanners are, however, mostly dependent on a focusing optical system, and particularly its focal length, limited, as a rule, by the dynamics of the scanner mirror in their translational speed. In order to be able to use rapid beam sources having a high repetition rate to increase the volume removal, many beam deviation systems available in the market, such as so-called Galvo or Galvano scanners are consequently too slow. Methods and devices would therefore be desirable for processing a workpiece using laser radiation, which, on the one hand, have a high removal rate and, on the other hand, enable a high processing precision.

SUMMARY OF THE INVENTION

Accordingly, a method is provided for processing a workpiece using laser radiation as well as a laser processing device for processing a workpiece using laser radiation. The laser processing device may be configured particularly to carry out a method according to the present invention, and the method may particularly be carried out using the provided laser processing device. By processing with laser radiation one may understand particularly laser ablation, i.e. a method in which a removal of material of the workpiece takes place, for instance, in that the material of the workpiece is vaporized. Accordingly, the laser processing device may be embodied in particular as a laser ablation device.

In the method provided, at least one laser beam is provided. Accordingly, the laser processing device has at least one laser source for providing at least one laser beam. In the provided method, the laser beam is affected using at least one variable beam forming device and subsequently impacts on at least one processing area of the workpiece. Using the beam forming device, the laser beam has impressed on it at least one specified adjustable beam profile at the location of the processing area.

By a beam forming device one should understand, within the scope of the present invention, basically any device which is configured to adjust a beam profile of the laser beam at the location of the processing area. In particular, in the case of this setting, one may select from among at least two, more particularly at least three, four, five or more beam profiles and/or the beam profile may be able to be set freely. The setting may take place in several steps or even in a stepless manner. By a beam profile, in this context, one may particularly understand a local intensity distribution at the location of the processing area.

By a processing area, one may generally understand a surface that is accessible for the laser radiation of the workpiece. During the method, this processing area may vary, since a material removal may take place, for example, and the processing area may thus shift, between several method steps, into the inner part of the workpiece. The processing area may be all in one piece, but it may also be composed of a plurality of subsurfaces.

The beam forming device may particularly be configured in order to generate at least two different patterns of illuminated and nonilluminated areas. By pattern one may understand in this case an adjustable sequence of differently illuminated areas, such as an adjustable sequence of illuminated and nonilluminated areas, in at least two dimensions. In each spatial direction, for example, at least two differently illuminated sections, for instance, at least two illuminated and nonilluminated sections may alternate in the pattern. The pattern of illuminated and nonilluminated areas, for example, may include a round, an oval, a rectangular and, in particular, a square pattern, so that the illuminated area, for example, forms a round, particularly circular or oval, and/or rectangular, particularly square area, within which material removal is able to take place, for example.

The method may especially be carried out in such a way that, one after the other, at least two different such patterns of illuminated and nonilluminated areas are produced. During a change between two varying patterns, a fluence may particularly remain essentially unchanged in the illuminated areas of the various patterns. By a fluence H one should generally understand, in this context, an areal density of the laser energy. By "essentially unchanged" one may understand, for example, an identity, wherein, for example, deviations of not more than +/−30%, particularly of not more than +/−20% and especially not more than +/−10% in the fluence are still tolerable in response to a change in the patterns. However, even a change between two different patterns, in which the fluence is changed, is basically possible.

Additional possible refinements relate to the beam forming device. As was mentioned above, this device may basically be any device which enables the setting of a beam profile at the location of the processing area. The beam forming device may, in particular, include a matrix of changing elements, the changing elements being configured to change components of the laser beam, which impinge upon the changing elements, in their phase and/or in their amplitude and/or in their intensity. Thus, the changing elements may be configured, for example, in a plane perpendicular to an optical axis of the laser beam, locally to change one or more parameters characterizing the laser beam, for instance, one or more laser parameters, selected from the group made up of the phase, the amplitude, the intensity and the polarisation. By matrix one should generally understand, in this case, an at least two-dimensional field of the changing elements which may be characterized by a coordinate system, for example. In this context, this may be a Cartesian coordinate system or a polar coordinate system. Thus, in the matrix, at least two of the changing elements mentioned may be situated in each spatial direction of the coordinate system, for example. The matrix, for example, may be generated in a plane, for instance, a plane that is perpendicular to the optical axis of the laser beam. This matrix may, for instance, be a rectangular matrix, in which at least two of the changing elements are situated in each spatial direction. Alternatively or in addition, a round, and particularly a circular matrix is also possible, in which the changing elements are situated in an annular manner, for example. Other embodiments of the beam forming device are basically also possible.

The laser beam is able to interact with the matrix of the beam forming device in various ways, which depend on the development of the changing elements. For instance, the laser beam is able to penetrate the matrix, so that a transmissive beam forming device is able to be used. Alternatively or in addition, the matrix may also have completely or partially reflecting properties, however, so that the matrix of the beam forming device may also be used in a reflective manner, for example.

Such changing elements, which are configured so as to change locally the phase and/or the amplitude and/or the intensity of the laser beam, for instance, to produce a specified pattern at the location of the processing area, are basically known from practice. Thus, for example, a phase shift is able to be produced using a matrix of switchable changing elements, the changing elements being able to have the effect of a phase shift based on switchable birefringent properties and/or based on a switchable electrooptical effect, for instance, an electrooptical effect of the first and/or second order. For this purpose, for example, birefringent and/or electrooptical materials may be used, such as so-called Pockels cells and/or Kerr cells. Alternatively or in addition, acousto-optic effects may also be used for example. The changing elements may be passed singly or in multiple fashion by the laser beam. The changing elements are also able to cooperate with one or more further elements such as filters and/or polarisation filters. For instance, the changing elements are also able locally to change a polarisation direction of the laser beam, so that, for instance, a pattern is created within the laser beam, at the location of the beam forming device, having areas of different polarisation directions. A polarization direction may, for instance, be affected by corresponding polarization-rotating elements, for instance, by optically active materials such as liquid crystals and/or inorganic optically active crystals and/or sugar. Such a matrix of changing elements, too, which are able to affect the polarization and particularly the polarization direction, and are able in this way to produce, for instance, a pattern of different polarization directions in the laser beam, may be used by themselves or in cooperation with other elements, in order to generate an intensity pattern, for instance, at the location of the processing area. Thus, for example, locally, at the location of the beam forming device, patterns of polarization directions may be set, wherein, for instance, between the beam forming device and the workpiece or the processing area, one or more polarization direction-selective elements may be provided, for instance, dichroic mirrors and/or polarization filters and/or polarization beam splitters. In this way, for example, using the beam forming device and the impression taking place there of a pattern of particular optical parameters, an intensity pattern is able to be produced in the laser beam at the location of the processing area. This intensity pattern is particularly able to be installed freely.

The changing elements are particularly able to be actuated electronically. This may especially be done according to known principles, since, for example, the electrooptical effect mentioned above is able to be controlled electronically. Alternatively or in addition, a polarization rotation may be achieved by changing an electrical field, as is known, for instance, from liquid crystal displays. Other types of electrically actuatable changing elements are also conceivable, for instance, by the changing elements being able to include a matrix of electrically actuatable micromirrors, especially based on semiconductor materials (such as so-called MEMS), that are producible according to the methods of microsystem technology.

The changing elements and their matrix are able to be actuated particularly using a pixel pattern, that is, using an image pattern, which may be a digital image pattern which, for example, is able to be specified using a dataprocessing device. Such an image pattern may be produced automatically or manually on a computer, which may then be transmitted to the matrix of the changing elements, using an appropriate actuation, for example.

Using the changing elements, particularly in a plane perpendicular to an optical axis of the laser beam, a pattern may be produced of a location-dependent phase modulation. This pattern may be made up of several areas, which are adjacent to one another in at least two dimensions, in different regions, the phase position of the laser beam being able to be set freely in each case or within a specified region. In this way, a phase pattern may be produced in the plane, perpendicular to the optical axis of the laser beam. In the method, furthermore, at least one focusing element may be used between the beam forming device and the processing area, such as at least one lens and/or at least one mirror having focusing properties. Such focusing elements may particularly work transformingly, so that the pattern of the location-dependent phase modulation at the location of the beam forming device is transformed into a pattern of a location-dependent intensity modulation at the location of the processing area, that is, on the processing area. Such a transformation takes place, for example, in that, on a collimated and/or homogenized laser beam, at the location of the beam forming device, the abovementioned phase pattern is impressed, for instance, using the matrix of the changing elements, and the phase pattern is then transformed by focusing using the focusing elements, by a Fourier transformation, occurring at that time, into a corresponding intensity pattern on the processing area.

The beam forming device may particularly have a so-called Spatial Light Modulator (SLM) and/or at least one micromirror system. By a Spatial Light Modulator one should generally understand a spatial modulator for light, which is configured to impress a modulation on the light spatially, for instance, in a plane perpendicular to a direction of propagation of the light. As was stated above, this modulation may be a local change of one or more of the parameters phase, amplitude, intensity and polarization, so that, for example, the value of these parameters is a function of the location in the plane perpendicular to the direction of propagation. In particular, it may be an SLM able to be actuated electronically. The SLM may, for instance, have a two-dimensional, for example, rectangular matrix of changing elements, according to the above description, for example. The SLM may, for example, be operated transmissively and/or reflectively. The SLM may particularly have a matrix of liquid crystal elements, which are able to be electrically actuated individually or in groups, and which are configured to affect in a targeted manner a phase position and/or the polarization of those components of the laser beam which pass through the respective liquid crystal element. In this way, as was described above, a phase position pattern may be impressed on the laser beam, at the location of the beam forming devices, in a plane perpendicular to the direction of propagation of the laser beam, using the SLM.

The beam forming device is particularly able to be actuated electronically, whereby because of the electronic actuation, the beam profile being able to be set, particularly freely set, for instance, in that an image pattern is able to be specified for the electronic actuation of the beam forming device, according to which a location-dependent affecting of one or more of the abovementioned parameters of the laser beam is then able to take place at the location of the beam forming device, for instance, in that, on the laser beam, in a plane perpendicular to the direction of propagation of the laser beam, which is also designated as the optical axis, a pattern is impressed in one or more of the parameters named, the phase, the amplitude, the intensity and the polarization, so that this parameter is location-dependent in the plane mentioned.

The laser beam is able to be expanded, particularly before impinging upon the beam forming device. Before the beam forming device in particular, for instance, between a laser source and the beam forming device, at least one optical device may be provided which expands the laser beam and or which homogenizes the laser beam. This may take place in a simple manner, for instance, using corresponding lens systems.

The laser beam may be focused particularly after passing the beam forming device, for instance, by focusing the former on the processing area. This embodiment of the method is of advantage particularly if the beam forming device is configured so as to impress a phase pattern on the laser beam, at the location of the beam forming device, which then, as was stated above, is transformed by the focusing to an intensity pattern at the location of the processing area.

Alternatively or in addition, the method may also be carried out, however, in such a way that the beam forming device is configured, for example, to generate an intensity pattern at the location of the beam forming device. In this case, it particularly may be, between the beam forming device and the processing area, that at least one imaging system is provided, the imaging system being configured, for example, to modify the intensity pattern, at the location of the beam forming device, to a corresponding identical, enlarged or reduced intensity pattern at the location of the processing area. Such imaging systems may include one or more objectives, for example.

The beam forming device may be changed, in particular, during the execution of the method. Thus, the method may include a sequence of at least two different illumination steps, for instance, which may be at least three different illumination steps or a plurality of different illumination steps, in the various illumination steps, the processing area of the workpiece being illuminated using different beam profiles of the laser beam. For example, a first illumination step may be provided in which the laser beam, at the location of the processing area, has a first diameter and/or an equivalent diameter and/or a first geometry, and at least one second illumination step, in which the laser beam has a beam profile on the processing area having a second diameter, that varies from the first diameter, and/or an equivalent diameter and or a second geometry that deviates from the first geometry. In this way, because of the sequence mentioned, for instance, one after another a removal using different beam profiles is able to take place, so that the method may generally be used in order to produce three-dimensional surfaces.

The beam profiles may particularly form, in each case, on the processing area, a pattern of illuminated and nonilluminated areas, a pixel pattern, in particular. In the illumination steps, a matrix of changing elements may be actuated, in each case, in a different manner, especially a matrix of changing elements which may be embodied according to the abovementioned possibilities.

In the different illumination steps, for example, in different planes of the workpiece, holes may be applied, in each case, to the workpiece of a different geometry and/or of a different depth. Consequently, the method may be used for a three-dimensional surface shaping.

Additional possible refinements relate to the laser processing device. Thus, the laser processing device may particularly have a control system, especially a control system having at least one data processing device, the control system being able to program the beam forming device, for example, in such a way that the beam profile is freely programmable at the location of the processing area. For instance, a pattern, such as an intensity pattern, may be impressed upon the beam profile at the location of the processing area, using the control system.

If the laser processing device has at least one control system, the control system may be configured especially to carry out a sequence of at least two different illumination steps, in the at least two different illumination steps, the processing area of the workpiece being illuminated using different beam profiles of the laser beam.

The laser source may particularly include at least one pulsed laser, particularly at least one short pulse laser and, especially particularly, at least one ultrashort pulse laser according to the definition given above.

As was stated above, the beam forming device is able to have, in particular, a so-called spatial light modulator, which is able to be operated transmissively and/or reflectively.

The beam forming device may particularly have at least one matrix of changing elements, which may be configured to generate a pattern of areas of different parameters of the laser beam in a plane that is perpendicular to the optical axis of the laser beam, that is, in a plane perpendicular to the direction of propagation of the laser beam, at the location of the beam forming device. The beam forming device may particularly be configured to generate an intensity pattern at the location of the beam forming device. In this case, it is particularly may be that the laser processing device has at least one imaging system between the beam forming device and the processing area of the workpiece, the intensity pattern at the location of the beam forming device being imaged into a corresponding intensity pattern on the processing area; the imaged pattern being able to include an identical pattern, an enlarged pattern or a reduced pattern.

Alternatively or in addition, the laser processing device may also be configured in such a way that the beam forming device, as stated above, generates a phase pattern in the plane perpendicular to the optical axis, so that, for instance, a matrix of the laser beam is able to be produced at regions of different phases or phase positions (the two terms are used synonymously, in this instance). In this case it particularly may be that the laser processing device has at least one focusing device between the beam forming device and the processing area of the workpiece, so that the phase pattern at the location of the beam forming device is modified to an intensity pattern at the location of the processing area. Generally speaking, the laser processing device may thus, for example, have at least one focusing element and/or at least one imaging optical system, such as at least one objective, between the beam forming device and the workpiece.

The laser processing device may further have at least one iris between the beam forming device and the workpiece. Using the iris, for instance, an iris diaphragm, undesired components of the laser beam may be kept away from the workpiece.

The laser processing device may furthermore have at least one mounting support for the reaccommodation of the workpiece. This mounting support is able to fix the workpiece at a specified location and/or may also be configured to position and/or orient the workpiece relative to the laser beam. For this purpose, for example, the mounting support may have at least one positioning device, for instance, having one or more actuators for positioning and/or orienting the workpiece.

The laser beam is able to impinge on a fixed location on the processing area. Accordingly, for example, the entire optical system of the laser processing device may be developed to be rigid, so that, for example, the workpiece is only able to be positioned and/or oriented relative to the laser beam. Alternatively or in addition, the laser beam may, however, embodied to be movable and/or able to be positioned and/or able to be oriented, for instance, in that the laser processing device has one or more elements positioning the laser beam, such as one or more movable mirrors, for instance, one or more of the Galvano scanners described above.

The method may particularly be carried out in such a way that a laser removal (laser ablation) takes place of material of the workpiece. This removal takes place in such way that no melting of the material of the workpiece takes place, or essentially no such melting. The beam profile at the location of the processing area may accordingly be set in such a way that it has a pattern of illuminated and nonilluminated areas, in the illuminated areas the intensity of the laser beam being above the intensity required for the vaporization of the material, but being below in the nonilluminated areas, so that, for example, no areas occur in which the intensity of the laser beam lies between an intensity threshold required for the melting of the material and an intensity threshold required for the vaporization of the material. Only in the area of a transition between the illuminated and the nonilluminated areas are such situations able to appear, these areas being however held to be small, so that a melting of the edges of the structures to be produced are held to be small. The method may particularly be carried out in such a way that a rapid beam form change, i.e. a rapid change of the beam profile, is able to be carried out at the location of the processing area. As was pointed out above, this may be achieved by freely programmable SLMs.

The method provided and the laser processing device provided in one or more of the embodiments described above have numerous advantages over known devices and methods of the known type. Instead of a scanning method, in which sequentially adjacent areas of the processing area of the workpiece are scanned, using the provided method, in particular, a complete or partial geometry may take place on the workpiece to be processed, with the aid of a flexible beam forming device. In this way, the beam profile may be formed in such a way that, at the location of the processing area, it corresponds to a desired removal geometry, for instance, in the processing plane. With that, for example, per laser pulse, a complete layer of the desired form is able to be removed in the nanometer to micrometer range. In the method provided, "laser stamping" may particularly be made possible, having almost any geometry, a precise removal being able to take place.

In the method provided, in particular, the removal of the material of the workpiece may be held melt-free. For this purpose, fluence H of the laser beam is held constant, as was stated above. Since the pulse energy $E_p$ is yielded, as a rule, using the area of processing spot $A_{spot}$ from $E_p = A_{spot}$ from $E_p = A_{spot} \cdot H$, one may work, as a rule, without disadvantage using clearly larger pulse energies than in the usual methods. At the same time, the removal volume per pulse rises, and the processing is correspondingly more rapid than would be possible with scanning by a laser beam. All the same, a scanning method may additionally be used, as stated above.

The flexible beam forming at the location of the processing area may, as described above, be implemented, in a simple and reliable manner, particularly by actuating the pixels of a spatial light modulator (SLM). For multi-step geometries, a first plane may be removed with this, for example, using a programmed beam form. Subsequently, for instance, by reprogramming the SLM, the respectively further stage may be driven in. Thereby, in general, within the scope of the present method, by a corresponding control system, for example, a programmable control system of an SLM, complex three-dimensional geometries may be provided in a precise manner, having speeds unachievable up to now.

Additional details and features of possible embodiments of the present invention are shown in the subsequent exemplary embodiments and drawings. The present invention is not restricted to the exemplary embodiments and drawings.

DETAILED DESCRIPTION

Figure 1:
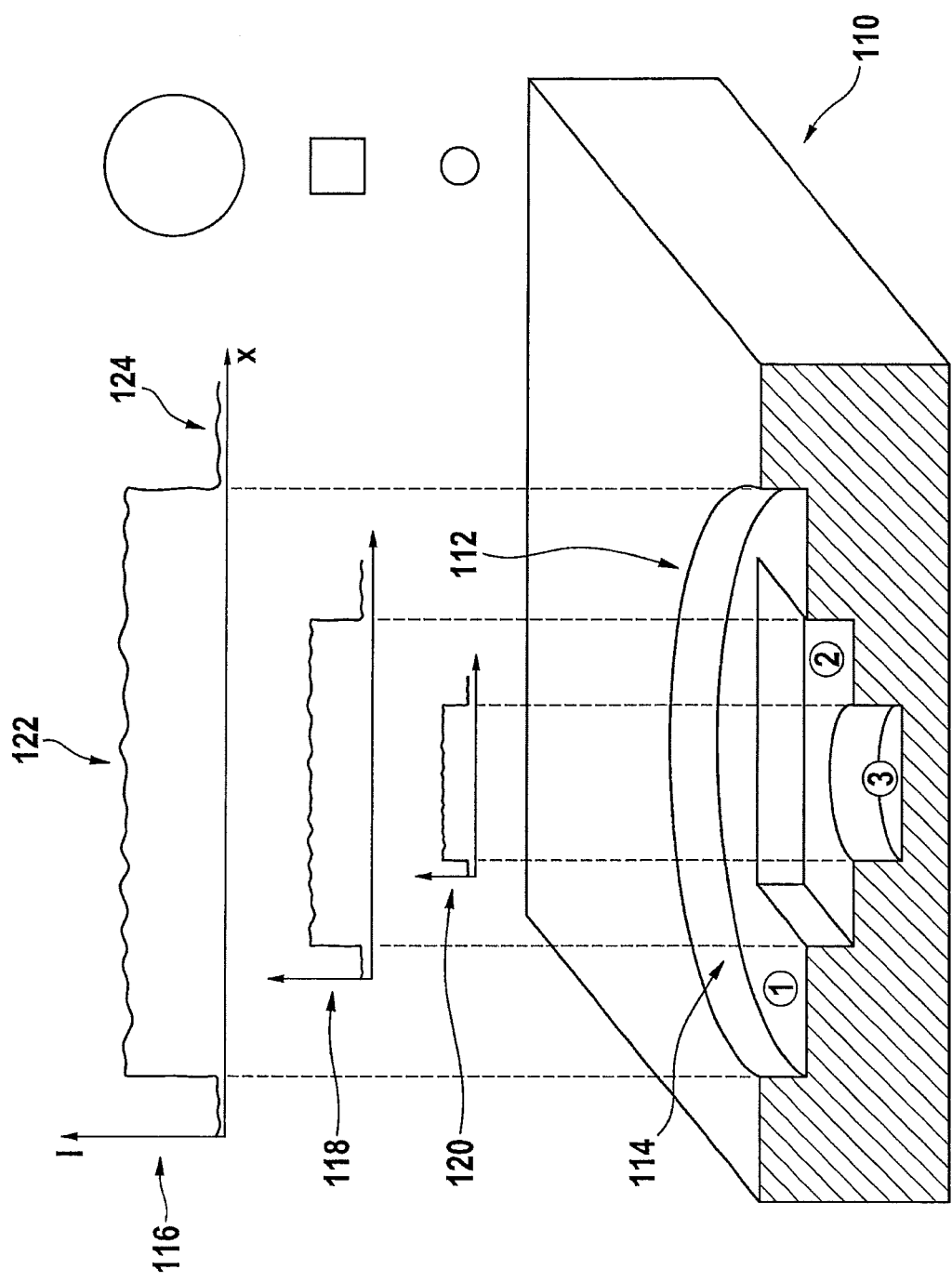
FIG. 1 shows an exemplary embodiment of a method according to the present invention, for processing a workpiece using laser radiation for the purpose of a three-dimensional laser ablation.

FIG. 1 shows schematically a method for processing a workpiece 110 having a processing area 112 shown in greatly standardized form. In the method, workpiece 110 is processed using a laser radiation not shown in FIG. 1, having at least one laser beam, a laser ablation taking place in an exemplary fashion in this case. In the exemplary embodiment shown, this laser ablation produces a three-dimensional geometry 114 in the workpiece 110, which in FIG. 1 is shown in a partial sectional representation. This method may also be designated as "laser stamping" for generating the three-dimensional geometry 114.

In the exemplary embodiment of the provided method, the method includes the method of a sequence of at least two different illumination steps, three different illumination steps being shown symbolically in FIG. 1. In each of these illumination steps, which may be carried out one after the other, workpiece 110 is illuminated in each case using a different beam profile of the laser beam. In an exemplary manner, three different beam profiles 116, 118 and 120 are shown in FIG. 1. In each of these beam profiles 116-120, the laser beam has a pattern of illuminated areas 122 and nonilluminated areas 124 at the location of processing area 112. Other beam profiles are also basically possible, however, at the location of processing area 112. In FIG. 1, for example, in each case one intensity distribution of the beam profiles is plotted in the sectional plane of workpiece 110 shown in FIG. 1, intensity I being plotted against location x. The method may particularly be carried out in such a way that, in the illuminated areas 122, intensity I lies above an ablation threshold, for instance, above a vaporization threshold of the material of workpiece 110, whereas in nonilluminated areas 124 the intensity is able to lie below a melting threshold of the material of workpiece 110.

Beam profiles 116-120 may differ, for instance, with respect to their diameters and/or their equivalent diameters and or their geometries. Thus, for instance, beam profiles 116-120 have, in an exemplary fashion in FIG. 1, diameters or equivalent diameters that become smaller in this sequence. To the right, next to beam profiles 116-120, it is indicated, in addition, that the beam profiles may have different geometries. Thus, first beam profile 116, for instance, same as third beam profile 120, may have a round geometry in a top view, whereas second beam profile 118, for example, has a square geometry in the exemplary illustration. Correspondingly, in the exemplary embodiment according to FIG. 1, a stepped geometry is created which is indicated by removal surfaces 1, 2 and 3. Thus the first step (designated by 1) corresponds to a state after the carrying out of the first illumination step using the first beam profile 116, the step designated symbolically by 2 corresponds the state after the second illumination step using the second beam profile 118, and the number 3 corresponds to the state after the third illumination step using the third beam profile 120.

Figure 2:
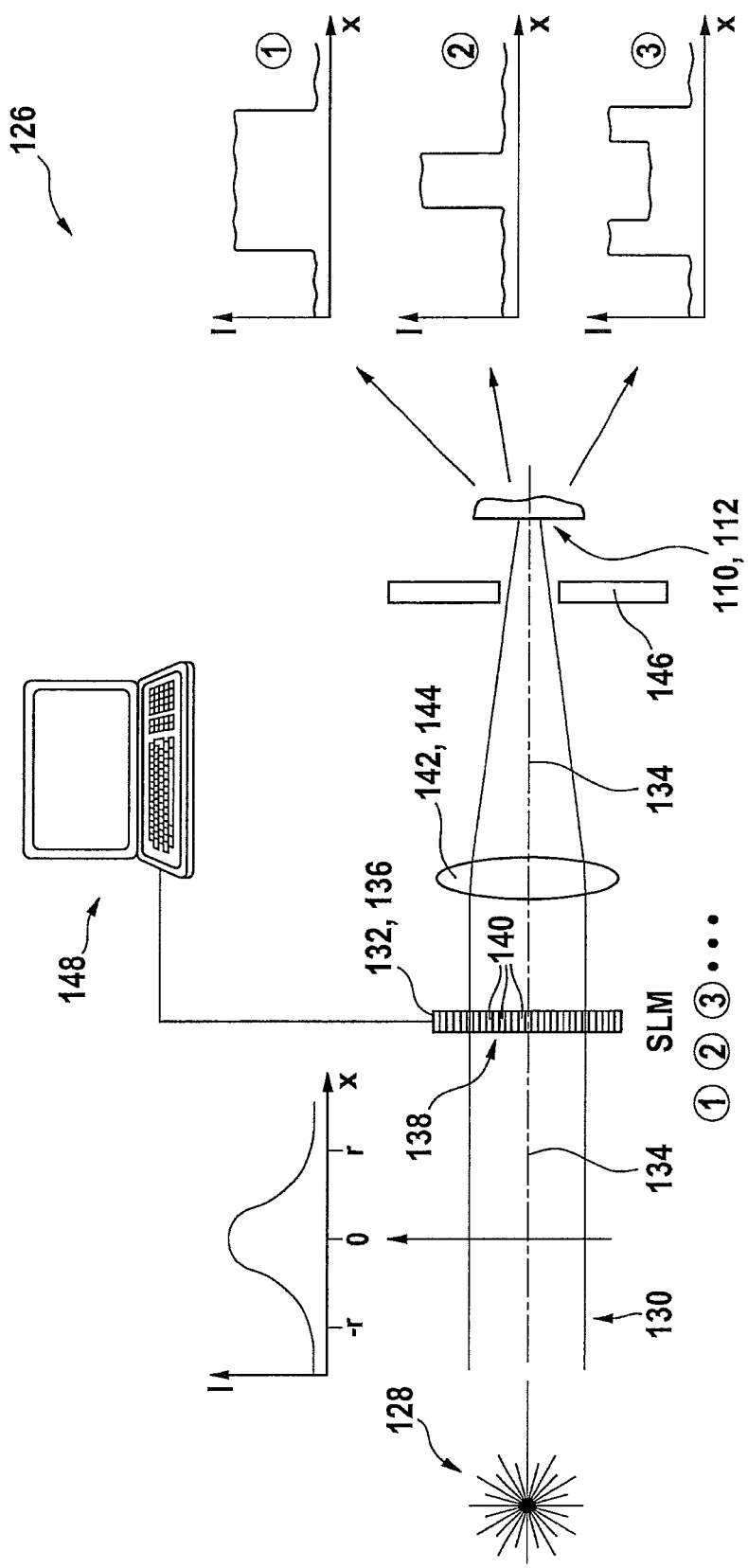
FIG. 2 shows a first exemplary embodiment of a laser processing device according to the present invention.

The flexible beam formation in a method according to the present invention may basically take place in various ways, in all cases at least one beam forming device being used to produce an adjustable beam profile at the location of processing area 112. A first exemplary embodiment of a laser processing device 126 able to be used, according to the present invention, is shown in FIG. 2. The laser processing device includes at least one laser source 128 that is only indicated in FIG. 1, for providing at least one laser beam 130. This laser beam may be or become collimated and/or homogenized, for example. As shown, laser beam 130, especially collimated laser beam 130, may have a Gaussian-shaped intensity profile.

Furthermore, laser processing device 126 has at least one beam forming device 132, which is configured to produce an adjustable beam profile at the location of processing area 112 of workpiece 110 (only indicated in FIG. 2). Three beam profiles are shown in FIG. 2 in exemplary fashion, designated by numbers 1, 2 and 3, in turn, in the form of an intensity distribution of intensity I as a function of location x, for instance, as a function of a location coordinate perpendicular to an optical axis 134 of laser beam 130. Digital step profiles having illuminated and nonilluminated areas may be produced, for example, (see, for example, intensity distribution 1), or even areas having several steps (see intensity distribution 3, for example).

Beam forming device 132 may be embodied in various ways. An exemplary embodiment is shown in FIG. 2, in which this beam forming device 132 includes a so-called spatial light modulator (SLM) 136. In the shown exemplary embodiment, for example, this SLM may be embodied in such a way that, in a direction perpendicular to optical axis 134, and using a corresponding matrix 138 of changing elements 140, it creates a pattern of a location-dependent phase modulation of laser beam 130. In this way, for example, corresponding to matrix 138, in each case, areas of different phase positions of laser beam 130 may be produced at the location of beam forming device 132, in a plane perpendicular to optical axis 134.

Between workpiece 110 and beam forming device 132, at least one focusing element may be provided, that is, at least one element which is configured to convert the pattern of different phase positions of laser beam 130 at the location of beam forming device 132 to an intensity distribution pattern at the location of a processing area 112. Focusing element 142 may be at least one lens 144, for example. As seen from a physical point of view, focusing element 142 may undertake a Fourier transformation of the phase position pattern at the location of beam forming device 132, so that intensity distribution I comes about at the location of processing area 112 as Fourier-transformed laser beam 130 at the location of beam forming device 132. Between focusing element 142 and processing area 112, optionally one or more irises 146 may be provided, for instance, in order to suppress spurious radiation and/or to avoid undesired border effects.

Beam forming device 132 may, for example, be actuated via at least one control system 148 of laser processing device 126, so that, for instance, a pattern of the intensity distribution at the location of processing area 112 is able to be adjusted by a corresponding setting of matrix 138, for instance by a corresponding electrical actuation.

In SLM 136, a phase delay may be adjustable individually, via an electrical actuation in each pixel of matrix 138, for the respective image points of the pattern, using matrix 138. This may take place for example, via liquid crystals and/or via an electrooptical effect. After this phase element, laser beam 130 passes through focusing lens 144 and/or another type of focusing optical system acting as focusing element 142. By the combined phase modulation and focusing, a different intensity distribution comes about in the working plane of laser processing device 126, in which processing area 112 of workpiece 110 is to be situated, depending on the setting of phase-setting SLM 136. The setting of SLM 136 for a desired form of intensity distribution in the working plane may, for instance, be determined ahead of time via wave optical simulations, and/or may be ascertained or refined, experimentally or even online, by measurements of the beam forming result. Interfering proportions of output, which are able to exit at other deviation angles from the optical system, may be screened off from workpiece 110, if necessary, by the at least one iris 146.

Figure 3:
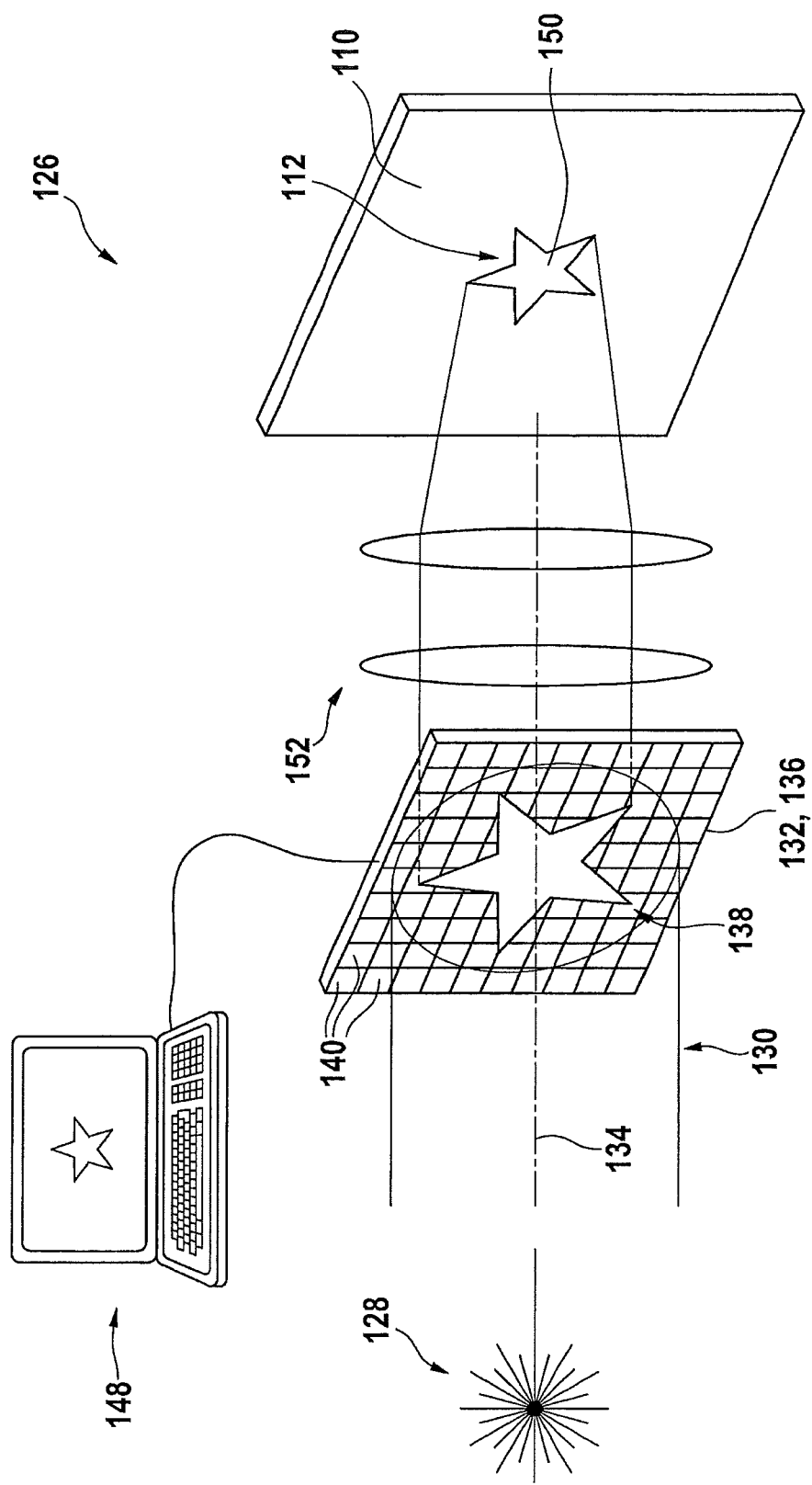
FIG. 3 shows a second exemplary embodiment of a laser processing device according to the present invention.

Alternatively or in addition to the embodiment shown in FIG. 2 of laser processing device 126 and/or beam forming device 132, other devices may also be used according to the present invention. Thus, FIG. 3 shows an exemplary embodiment that is basically analogous to FIG. 2, which is able to differ essentially by the embodiment of beam forming device 132. In this case, a beam forming device 132 is used having a plurality of changing elements 140, which are able to produce a pattern of an intensity distribution of laser beam 130, for instance, in a plane perpendicular to optical axis 134. In general, for instance, via a modulation of an intensity of each changing elements 140, that is each pixel of matrix 138, any desired beam distribution may be produced in the raw beam of laser beam 130 before passing beam forming device 132. In this context, proportions of output not matching the desired beam profile are able to be spatially cut off or locally weakened. For example, individual pixels of matrix 138 may be switched to transparent and others, in turn, to opaque. Again, beam forming device 132 may be actuated by a control system 148, for example. The pattern of matrix 138 may correspond essentially to a pattern of an area 150 that is to be removed at processing area 112, while taking into account corresponding distortions and/or enlargements and/or reductions. Accordingly, the pattern for matrix 138, specified using control system 148, may also correlate essentially in its shape to the geometry of region 150 that is to be removed. A removal may thus be produced using the transparent pixels of matrix 138. The intensity distribution in the plane perpendicular to optical axis 134 at the location of beam forming device 132 may be imaged onto processing area 112 using a corresponding imaging optical system 152, such as using an objective and/or a similarly imaging device, so that an image of the pattern produced by matrix 138 of the intensity distribution is created on processing area 112. As to its geometry and/or its size, this image is able to be identical to the pattern at the location of matrix 138, but it may also be enlarged, reduced or distorted. Various embodiments are conceivable.

Consequently, SLM 136 may act, for example, like a combination of a freely programmable iris geometry having a freely programmable reducer geometry. Besides a large power loss because of beam regions cut off, there are also created, in many cases, at the SLM interference effects by diffraction at the edges of the iris, which is not shown in FIG. 3. By a geometric-optical imaging of the intensity distribution after the iris onto the workpiece surface, that is, processing area 112 (relay imaging), the freely programmable geometry of the intensity distribution on workpiece 110 may be used for processing. Therewith, the effects of the diffraction on the process are minimized in the imaging plane in which the processing area 112 is positioned. In order to minimize the power loss that is unavoidable as a rule, by fading out beam proportions, one may particularly use a homogenized laser beam 130. This homogenized laser beam 130 may, in particular, be just big enough that it swamps out a free aperture of an iris diaphragm. In addition, laser beam 130 may be configured to avoid power losses by partial reduction of individual pixels of matrix 138 in such a way that it has no Gaussian profile, but is able to be homogenized already before intensity-setting SLM 136 by a beam formation of the raw beam, or is already emitted homogenized by laser source 128.

What is claimed is:

1. A method for processing a workpiece using laser radiation, the method comprising:
    providing at least one laser beam, which is affected using at least one changeable beam forming device, the at least one beam forming device being disposed in a plane perpendicular to an optical axis of the at least one laser beam emitted directly from the at least one laser source, the laser beam subsequently impinging upon at least one processing area of the workpiece;
    performing a sequence of at least two different illumination steps, in which in the different illumination steps, the processing area of the workpiece is illuminated using different beam profiles of the laser beam; and
    impressing, using the beam forming device, at least one specified adjustable beam profile on the laser beam at the location of the processing area,
    wherein in the different illumination steps, in each case in different planes of the workpiece, holes are applied to the workpiece of a different geometry and/or of a different depth.

2. The method of claim 1, wherein the beam forming device is configured to produce at least two different patterns of illuminated and nonilluminated areas on the processing area, and wherein during a change between two different patterns, a fluence in the illuminated areas remains essentially unchanged.

3. The method of claim 1, wherein the beam forming device has a matrix of changing elements, the changing elements being configured to change components of the laser beam, which impinge upon the changing elements, in at least one of the components, including at least one of a phase, an amplitude, an intensity and a polarization.

4. The method of claim 3, further comprising:
    producing, using the changing elements, in a plane perpendicular to an optical axis of the laser beam, a pattern of a location-dependent phase modulation; and
    transforming, using at least one focusing element, the pattern of the location-dependent phase modulation into a pattern of a location-dependent intensity modulation on the processing area.

5. The method of claim 3, further comprising:
    producing, using the changing elements in a plane perpendicular to an optical axis of the laser beam, a pattern of a location-dependent intensity modulation; and
    imaging, using at least one imaging optical system, the pattern of the location-dependent intensity modulation into a pattern of a location-dependent intensity modulation on the processing area.

6. The method of claim 1, wherein the beam forming device includes at least one of at least one spatial light modulator and at least one micromirror system.

7. The method of claim 1, wherein, in the different illumination steps, in each case one matrix of the changing elements of the beam forming device is actuated in a different manner.

8. The method of claim 1, wherein the workpiece is processed using laser radiation, for the purpose of laser ablation.

9. The method of claim 1, wherein each illumination step illuminates the processing area of the workpiece with a pattern having a sequentially smaller illumination area than a previous illumination step.

10. A method for processing a workpiece using laser radiation, the method comprising:
    providing at least one laser beam, which is affected using at least one changeable beam forming device, the at least one beam forming device being disposed in a plane perpendicular to an optical axis of the at least one laser beam emitted directly from the at least one laser source, the laser beam subsequently impinging upon at least one processing area of the workpiece;

performing a sequence of at least two different illumination steps, in which in the different illumination steps, the processing area of the workpiece is illuminated using different beam profiles of the laser beam; and impressing, using the beam forming device, at least one specified adjustable beam profile on the laser beam at the location of the processing area, wherein each illumination step applies the laser beam to a removal surface of the workpiece that is sequentially deeper into the workpiece than a previous removal surface, where the removal surface and the previous removal surface form a stepped geometry in the workpiece.

* * * * *